US005389881A

United States Patent [19]
Bittar et al.

[11] Patent Number: 5,389,881
[45] Date of Patent: Feb. 14, 1995

[54] WELL LOGGING METHOD AND APPARATUS INVOLVING ELECTROMAGNETIC WAVE PROPAGATION PROVIDING VARIABLE DEPTH OF INVESTIGATION BY COMBINING PHASE ANGLE AND AMPLITUDE ATTENUATION

[75] Inventors: Michael S. Bittar, Houston; Paul F. Rodney, Spring, both of Tex.

[73] Assignee: Baroid Technology, Inc., Houston, Tex.

[21] Appl. No.: 918,460

[22] Filed: Jul. 22, 1992

[51] Int. Cl.[6] .......................... G01V 3/18; G01V 3/12
[52] U.S. Cl. ..................................... 324/338; 324/341
[58] Field of Search ............... 324/339, 338, 341–356, 324/369, 334, 346, 364

[56] References Cited

U.S. PATENT DOCUMENTS

| 4,009,434 | 2/1977 | McKinlay et al. | 324/6 |
|---|---|---|---|
| 4,012,689 | 3/1977 | Cox et al. | 324/6 |
| 4,052,662 | 10/1977 | Rau | 324/6 |
| 4,107,598 | 8/1978 | Meador et al. | 324/341 |
| 4,209,747 | 6/1980 | Huchital | 324/338 |
| 4,553,097 | 11/1985 | Clark | 324/338 |
| 4,785,247 | 11/1988 | Meador et al. | 324/338 |
| 4,899,112 | 2/1990 | Clark et al. | 324/338 |
| 5,278,507 | 1/1994 | Bartel et al. | 324/338 |

OTHER PUBLICATIONS

SPE 12167, P. F. Rodney, The Electromagnetic Wave Resistivity MWD Tool, Oct. 1983, 16 pgs.

Primary Examiner—Kenneth A. Wieder
Assistant Examiner—Jay M. Patidar
Attorney, Agent, or Firm—Browing, Bushman, Anderson & Brookhart

[57] ABSTRACT

An electromagnetic wave propagation well logging system for measuring dielectric constant and/or formation resistivity (conductivity) includes three transmitters and a pair of receivers. The receiver pair is connected to circuitry that measures the amplitude ratio between the receivers, as well as the phase angle difference between the receivers. Signals representative of the detected amplitude ratio and of the detected phase angle difference are combined in such a manner as to make the depth of investigation controllable. Methods are also disclosed for maintaining a common depth of investigation as the well logging instrument traverses the earth borehole.

20 Claims, 11 Drawing Sheets

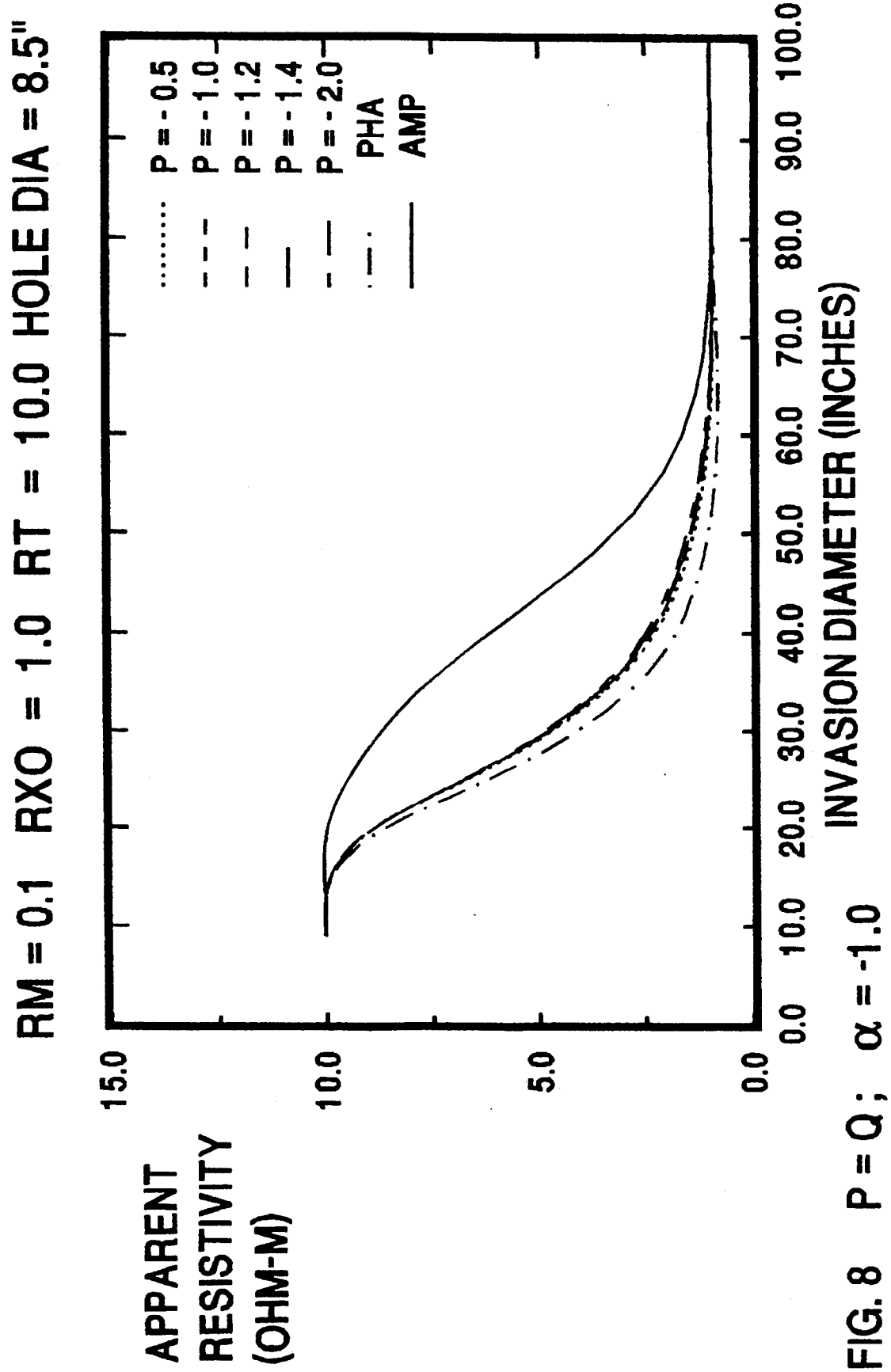
FIG. 8  $P = Q$;  $\alpha = -1.0$

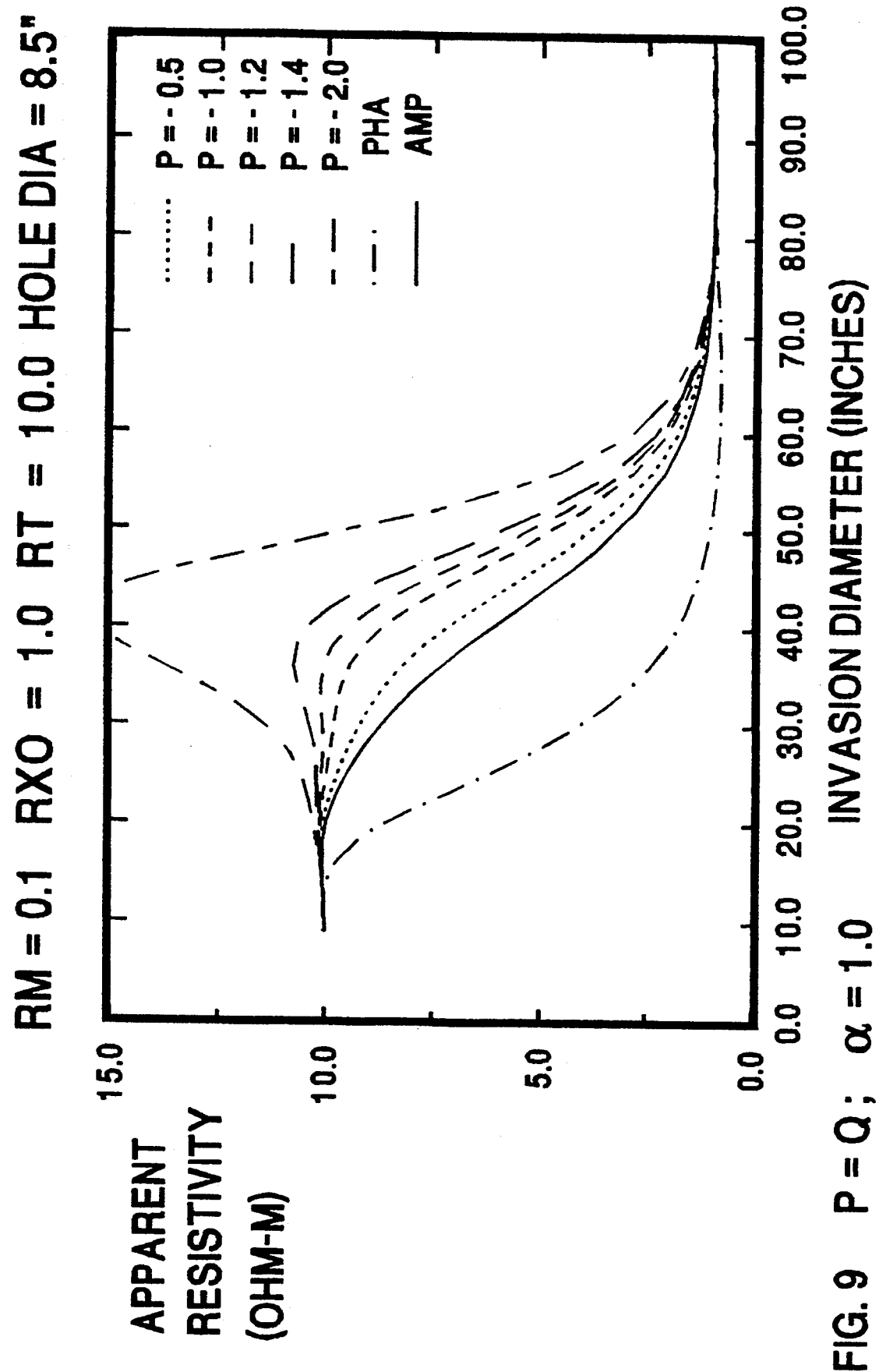
FIG. 9  P = Q;  α = 1.0

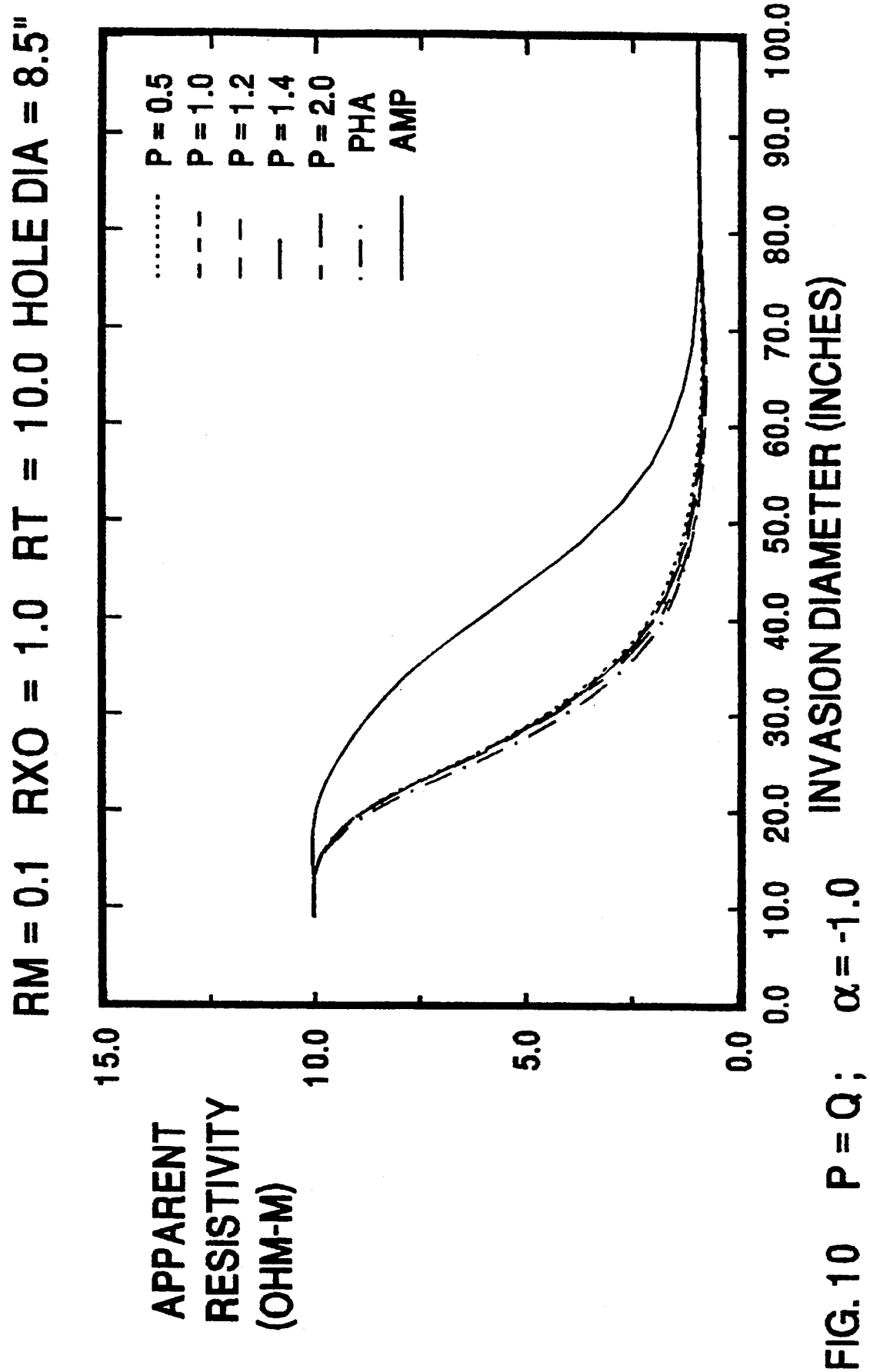
FIG. 10  P = Q;  α = -1.0

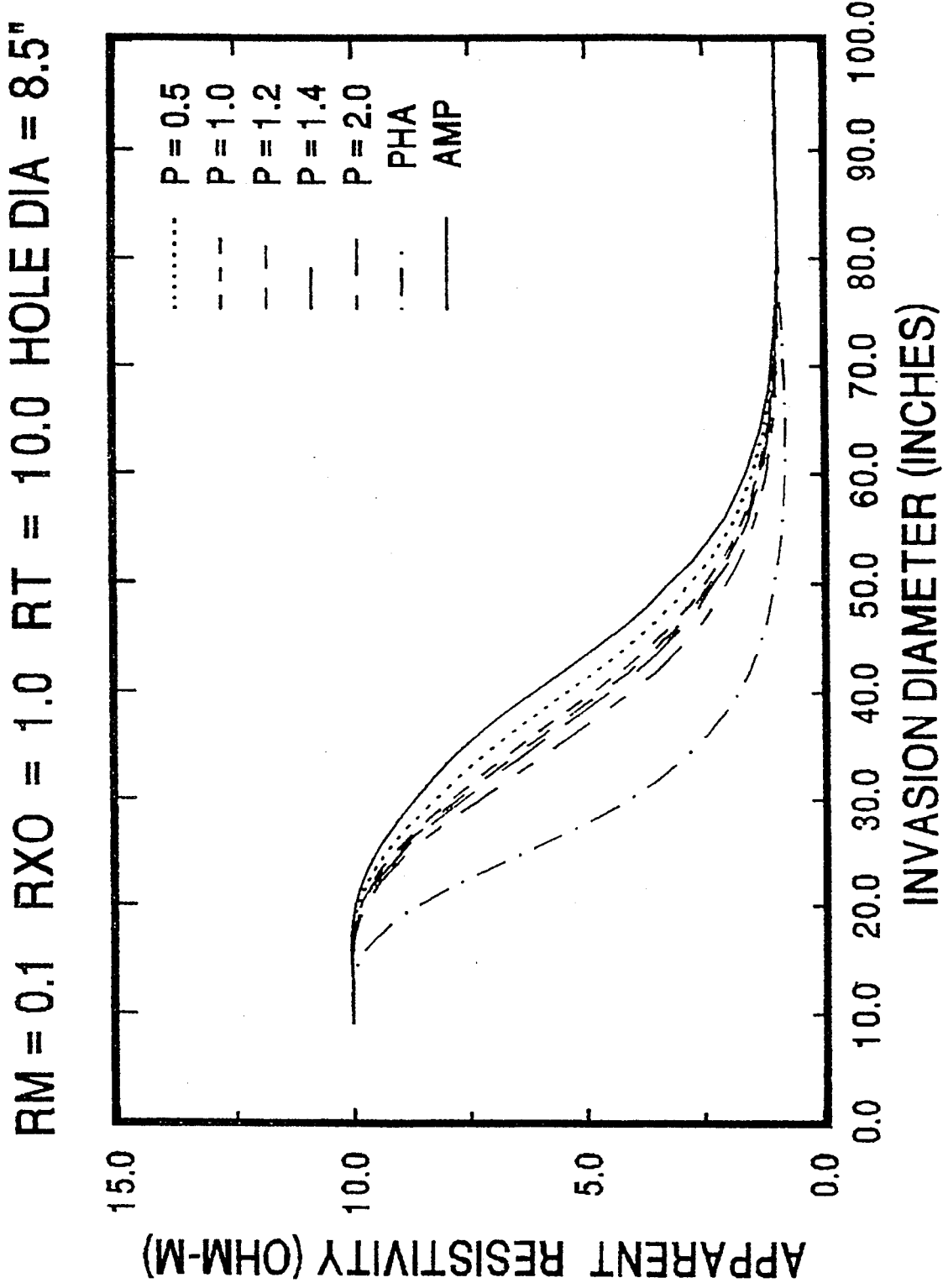
FIG. 11: P = 0; α = 1.0

WELL LOGGING METHOD AND APPARATUS INVOLVING ELECTROMAGNETIC WAVE PROPAGATION PROVIDING VARIABLE DEPTH OF INVESTIGATION BY COMBINING PHASE ANGLE AND AMPLITUDE ATTENUATION

BACKGROUND OF THE INVENTION

1. Field of the Invention

The present invention relates generally to a method and apparatus for measuring formation parameters by transmitting and receiving electromagnetic signals within a logging instrument in an earth borehole. More particularly, the present invention is related to downhole logging tools which use electromagnetic energy to perform measurements of formation or borehole parameters.

2. Description of the Background

It is desirable for many reasons to transmit electrical signals through the earth as a medium, and to receive the signals at a location spaced from the transmitter. Such a signal system is, for example, used both for the determination of various parameters associated with the medium and for communication purposes. These systems are often used in the investigation of the environment surrounding a borehole, and in particular, the surrounding formations. Various types of borehole logging systems are available to perform these investigations. A class of these systems utilizes electromagnetic field phenomena to obtain data from the environments surrounding the borehole. One type of prior art logging is electrode logging which utilizes an electric field in the surrounding formation to produce a measure of the conductivity of the formation. A conductive mud is necessary for proper use of this system, thus rendering the system inoperative with oil based muds. Inductive logging is another type of prior art electromagnetic logging which uses a time-varying magnetic field in the formation to produce a secondary current flow in the formation. The secondary current flow sets up a second magnetic field which induces current in receiving coils positioned in the borehole, the induced current in the receiving coil or coils being proportional to the secondary current flow in the formation and thus is directly proportional to the conductivity or inversely proportional to the resistivity of the surrounding formation. Using electromagnetic energy for investigating the environment around a borehole is the subject of the present invention.

In the art of well logging, it is well known that it is desirable to be able to measure the parameter of interest, for example, formation resistivity, at different radial distances from the borehole. This is commonly referred to as making measurements at different depths of investigation.

For example, in U.S. Pat. No. 3,453,530 to G. Attali, there is a general discussion of induction logging and of the need for multiple depth investigation measurements, at least as far as they pertain to wireline logs. In providing such a showing, there is a disclosure of producing simultaneous resistivity measurement of three radially different formation zones. Also, the patent recites that when relatively thin formations are encountered, more than one type of formation may enter into the measurement being made at any given moment and that this same problem is encountered at the boundary between two different formations. From this disclosure, those skilled in the art will recognize that it is highly desirable that all measurements be made with as fine a bed resolution as possible and that the bed resolution of all the sensors be closely matched. It is also clear that the Attali system shows the use of the same transmitters for different receiver systems.

In U.S. Pat. No. 3,893,020 to R. A. Meador and L. Thompson, there is a teaching of the use of two transmitters at different frequencies with a single receiver but which works with frequencies considerably higher, perhaps an order of magnitude, than those used in accordance with the present invention. Moreover, in the disclosure of Meador and Thompson, the signals from the two transmitters are received at the receiver coil simultaneously. In their preferred embodiment, Meador and Thompson use different frequencies and different transmitter spacings to concentrate the electromagnetic field at the same depth in the formation in order to calculate the dielectric constant and conductivity of a portion of the formation. Measurements at two frequencies but at the same depth in the formation are necessary since in the disclosure of Meador and Thompson, all measurements are based solely on the received amplitude of the signal.

U.S. Pat. No. 4,319,192 to R. Chemali and J. Tabanou, as well as U.S. Pat. No. 4,107,597 to Meador, et at.; U.S. Pat. No. 3,551,797 to Gouilloud, et al.; and U.S. Pat. No. 4,209,747 to Huchital, are typical of many patents, some with multiple frequencies, that show the use of multiple transmitters with multiple receiver pairs to obtain multiple depths of investigation.

In U.S. Pat. No. 4,451,789 to Meador, there is a suggestion of the desirability of making a plurality of radially different measurements at a single vertical depth, but no disclosure of how to accomplish this goal.

U.S. Pat. No. 4,818,946 to T. D. Barber uses a particular antenna array and digital processing techniques in an attempt to enhance the resolution of an induction logging tool. Barber states that resolutions of the multi-depth sensors in a conventional logging suite differ, the deep reading sensors having a poorer resolution than the shallow reading sensors. Barber's method requires at least one transmitter and at least two receivers.

U.S. Pat. No. 4,837,517 to T. D. Barber shows the use of one or more transmitters with two or more receivers.

U.S. Pat. No. 4,873,488 to T. D. Barber, R. N. Chandler, and J. F. Hunka is another example of a system using at least one transmitter with at least two receiver arrays.

In U.S. Pat. No. 4,899,112 to B. Clark, J. Jundt, M. Luling, and M. O. Ross, there is described a system for determining formation resistivity at both shallow and deep depths of investigation, but which is dependent upon the long-recognized phenomenon, for example, as fully disclosed in U.S. Pat. No. 4,209,747 to Huchital, that measuring phase shift between a pair of receivers provides a different depth of investigation than measuring amplitude attenuation between that same pair of receivers.

In his paper entitled "Investigation Depth of Coil Type MWD Resistivity Sensor," (paper C, SPWLA 32nd Annual Logging Symposium, Jun. 16–19, 1991), Dr. Liang C. Shen shows how two additional investigation depths can be obtained by using algorithms based on the real and on the imaginary parts of the magnetic field received at the antennas, a concept that originated in induction logging where the real part is designated the in phase component and the imaginary part is designated the X or quadrature component.

In the paper entitled "*Invasion Profile from the Digital Induction Log*" presented by P. A. S. Elkington and H. K. Patel at the SPWLA 26th Annual Logging Symposium on Jun. 17–20, 1985, there is a general discussion of the use of one transmitter and four receivers. The paper discusses the desirability of producing logs from different investigation depths with the same vertical response and resolution and presents evidence of having achieved that goal using a combination of digital processing and mutual inductance cancellation.

In the paper entitled "*Introduction to the High Resolution Induction Tool*" by R. Strickland, P. Sinclair, J. Harber, and J. DeBrecht, presented at the SPWLA 28th Annual Logging Symposium Jun. 29–Jul. 2, 1987, there is a disclosure that "These prototypes are of entirely new mechanical construction in which every turn of every coil is positioned precisely along a mandrel made of highly temperature-stable materials. The position of each turn was calculated to precisely zero the mutual inductance with no extra adjustment." This language implies a plurality of receiving antennas, as is discussed in the prior art of the patents listed above where mutual inductance is discussed. There is an apparent inconsistency within the paper because a later statement recites that "All three measurements are made at the same point so that depth shifting errors are eliminated." The statement above with respect to mutual inductance is apparently incompatible with the statement that all three measurements are made at the same point since the use of multiple receivers implies that measurements cannot be made simultaneously at the same depth. It may be that the digital signal processing techniques used with this prior art high resolution induction sensor makes it possible, for all practical purposes, to claim that the measurements are made at the same depth but this is only an inference. By the manner in which the measurements are made, they cannot be made simultaneously at the same point. It should be clear that the paper does not directly state that the measurements are made simultaneously at the same point, but there can be no other reason to address this issue since most tools can make measurements at the same point, but at different times.

Another method uses multiple frequencies, as, e.g., in "*Resistivity profiling with a Multi Frequency Induction Sonde,*" David F. Allen and Scott J. Jacobsen, presented at the SPWLA 28th Annual Logging Symposium, Jun. 29–Jul. 2, 1987. A variation on this theme is the use of a pulsed induction logging tool such as that produced by MPI, Inc., 4174 Technology Drive, Freemont, Calif. 94538. This sensor simultaneously transmits at a wide range of frequencies.

In the paper entitled "*Applications of the High Resolution Deep Investigation Resistivity Instrument,*" presented by R. A. Khokhar, T. D. Lawrence, and W. H. Fertle at the SPWLA 12th French Section (SAID) Int. Formation Evaluation Symposium, Transaction Paper No. K, 1989, there is a discussion dealing with a lateral, pad contact type of device in which it is stated that a bed resolution of 0.5 inch can be obtained with their tool while a resistivity of beds 1.0 inch thick or better can be obtained. This is an example of the difference between resolution and full bed response with the use of two distinctly different tools to make the multiple depth measurements. The paper does clearly identify a need to provide measurements at multiple depths but with a common bed resolution which is as high as is practical.

In the paper entitled "*Field Test Results of the High Resolution Induction,*" presented by M. W. Alberty and D. S. Epps, presented at the SPWLA 29th Annual Logging Symposium on Jun. 5–8, 1988, it is made quite clear that it is highly desirable to decouple the vertical and horizontal bed responses.

In yet another paper entitled "*Advances in High Resolution Logging,*" published in the Technical Review, Volume 36, No. 2, pages 4–14, there is a discussion of the phasor induction tool. In particular, the paper shows that the high resolution of their sensor is obtained, not directly from the deep reading portion of the sensor, but from the shallow reading portion of the sensor. High resolution information thus obtained is used to synthetically improve the resolution of the deep reading portion of the sensor.

In the paper entitled "*Vertical Enhancement by Combination and Transformation of Associated Responses,*" presented by P. A. S. Elkington, J. R. Samworth and M. C. Enstone at the SPWLA 31st Annual Logging Symposium on Jun. 24–27, 1990, there is a discussion of there being a fairly sharp distinction between bed resolution and bed response. This distinction is in accord with the comments made above with respect to U.S. Pat. No. 4,818,946. In this paper, a general method of enhancing the vertical response of a wide class of sensors is discussed. The point of the paper is that there are often features visible in a log (resolved), but which are not presented on the log at anywhere near their true value (fully developed). It is thus clear that features are visible in a short spaced sensor which are not in a longer space sensor because, with the types of sensors considered, bed resolution decreases as the depth of investigation increases.

In the paper entitled "*Theory of Microinduction Measurements*" presented by W. C. Chew and R. L. Kleinberg in the IEEE Transactions on Geoscience and Remote Sensing, Vol. 26, No. 6, November 1988 at pages 707–719, there is the discussion of the use of an induction-type measurement made with a very shallow depth of investigation. This paper discloses that for the extremely small dimensions of the sensor, it is possible to make a crude approximation to the sensor response using geometrical factor theory, but that the response is best understood in terms of what the authors refer to as a "full wave" theory. The frequency of induction of the microinduction sensor is 25 MHz and the plane of the transmitting loop antenna is parallel to the borehole wall.

In U.S. Pat. No. 4,940,943 to R. P. Barrel and P. F. Rodney, assigned to the assignee of the present invention, there is a teaching of using a single transmitter with a pair of receivers in which the transmitter loop antenna is located in a first cutout within the conductive housing and the receiver antennas are located in additional cutouts in the conductive housing, such cutouts in the conductive housing being used to affect the patterns of the electromagnetic energy from the transmitter to the receivers.

Finally, in U.S. Pat. No. 4,622,518 to Cox, et at., there is disclosure of making a well log having a single deep depth of investigation using what the patentees refer to, perhaps erroneously, as secondary electromagnetic fields. Their disclosure involves the inclusion of phase difference and amplitude attenuation into a single, parameterless formula, a formula intended to subtract out the primary field to obtain a resultant "secondary field." However, what Cox, et al. are referring to as a secondary field lacks all of the usual properties of a secondary field. This erroneous concept appears to be a carryover from D. S. Dayev, *High-Frequency Electromagnetic Techniques of Well Logging*, "Nedra" Publishing House, Moscow, 1974, translated from Russian by Barbara Evans. This book is replete with the secondary field concept, which is first introduced in its pages 36-39.

Each of the above-noted prior art references share a common thread of endeavor, that of attempting to "see" into the formation surrounding an earth borehole some distance, typically to determine the formation resistivity, or conductivity, as the case may be.

However, the prior art has no teaching or disclosure of a well logging system enabling one to control the depth of investigation without changing the physical characteristics of the tool, i.e., without changing the frequency of the generated electromagnetic energy, or the number or spacing of the transmitter or transmitters, or the number or spacing of the receivers.

It is therefore the primary object of the present invention to provide new and improved method and apparatus for logging the resistivity of formations surrounding a borehole, at multiple depths of radial distance from such borehole;

It is also an object of the invention to provide a new and improved method and apparatus that provide multiple depths of investigation with a reduced number of antennas, thus providing a tool configuration which is shorter and more reliable;

It is another object of the invention to provide a new and improved method and apparatus that provide a continuum of depths of investigation into the formations surrounding an earth borehole.

SUMMARY OF THE INVENTION

For use in electromagnetic wave propagation logging systems, methods and apparatus are provided in accord with the present invention that measure the amplitude attenuation and the phase angle difference between first and second receivers. The resulting amplitude and phase measurement signals are then combined to produce one or more signals functionally related to the dielectric constant and/or the resistivity (conductivity) of the formation at controlled depths of investigation.

The methods and apparatus according to the present invention also produce indications of dielectric constant and/or resistivity (conductivity) at a common depth of investigation as the logging apparatus traverses the length of the borehole.

BRIEF DESCRIPTION OF THE DRAWINGS

These and other objects, features and advantages of the present invention will be readily understood from a reading of the following specification, making reference to the drawings in which:

FIGS. 4-11 illustrate graphically the effects upon depth of investigation accomplished by practicing the present invention.

DETAILED DESCRIPTION OF THE INVENTION

Figure 1:
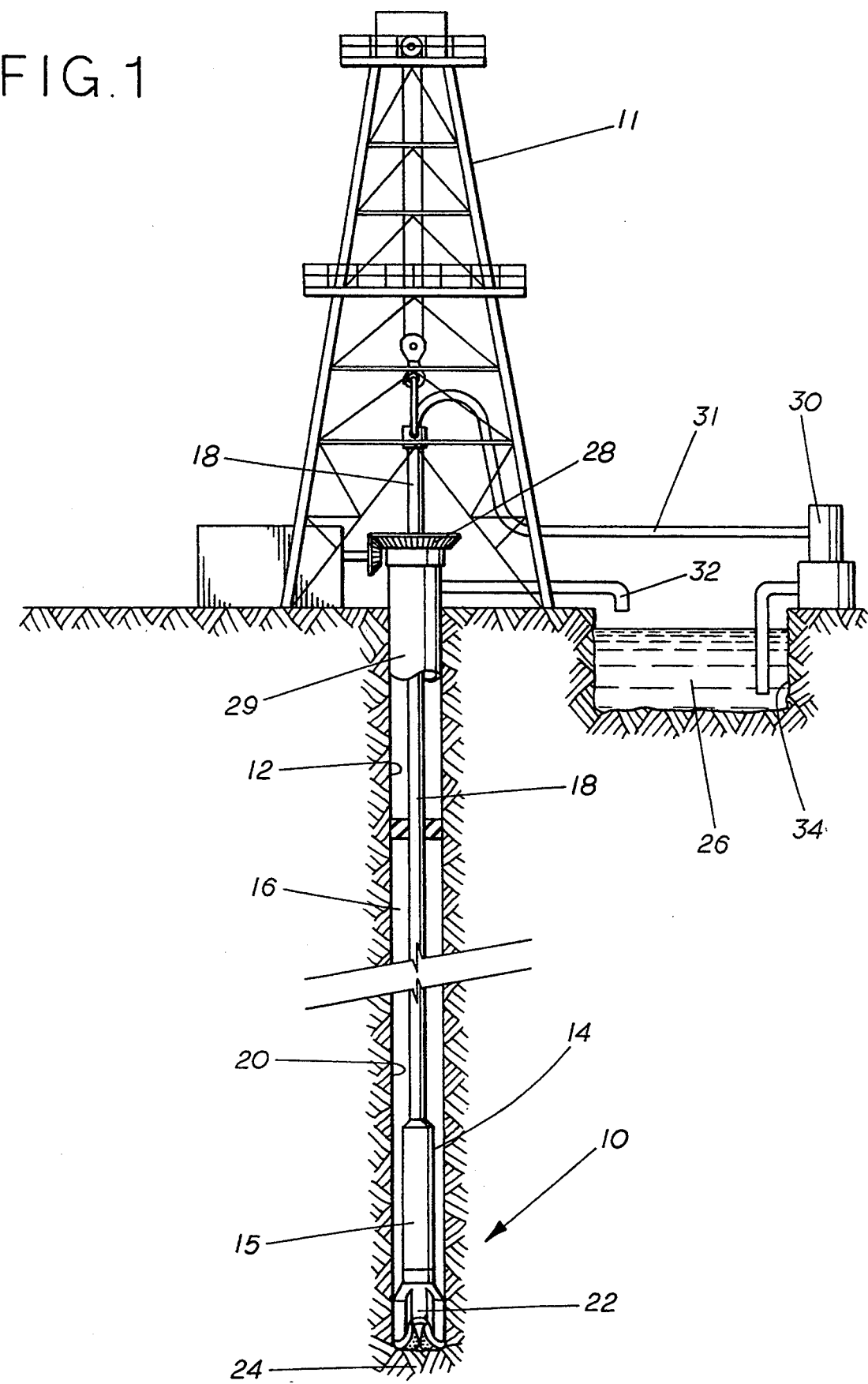
FIG. 1 is an elevated view of a drilling rig from which is suspended a drill string in an earth borehole.

Referring to FIG. 1, there is shown a drilling rig 11 disposed on top of a borehole 12. A system 10 for dielectric constant and/or resistivity (conductivity) logging is carried by a sonde or sub 14 comprising a portion of a drill collar 15 and is disposed within the drill string 18 while the drilling operations are in progress.

A drill bit 22 is disposed at the lower end of drill string 18 and carves the borehole 12 out of the earth formations 24 while drilling mud 26 is pumped from the wellhead 28. Metal surface 29 casing is shown positioned in the borehole 12 above the drill bit 22 for maintaining the integrity of the borehole 12 near the surface. The annulus 16 between the drill string 18 and the borehole wall 20 creates a theoretically closed return mud flow path. Mud is pumped from the wellhead 28 by a pumping system 30 through mud supply line 31 coupled to the drill string 18. Drilling mud is, in this manner, forced down the central axial passageway of the drill string 18 and egresses at the drill bit 22 for carrying cuttings comprising the drilled sections of earth, rock and related matter upwardly from the drill bit to the surface. A conduit 32 is supplied at the wellhead for channeling the mud from the annulus 16 to a mud pit 34. The drilling mud is typically handled and treated at the surface by various apparatus (not shown) such as outgasing units and circulation tanks for maintaining a selected viscosity and consistency of the mud. The present logging system permits the measurement, for example, of formation resistivity in the regions surrounding the borehole during the pumping of drilling fluid through the drill string and borehole.

As shown in FIG. 1, the sub 14 and drill collar 15 comprise a portion of the formation resistivity logging system 10 of the present invention and the downhole environment. The system 10 is constructed to generate a series of signals for telemetry to the wellhead or a downhole recording system the signals of which are indicative of the formation resistivity of the earth formations adjacent to the borehole. The requisite telemetry and analysis systems are deemed to be of conventional design and are not specifically set forth or addressed herein other than in general terms. The method and apparatus for measurement of formation resistivity is, however, described in detail below and is a subject of the present invention.

Figure 2:
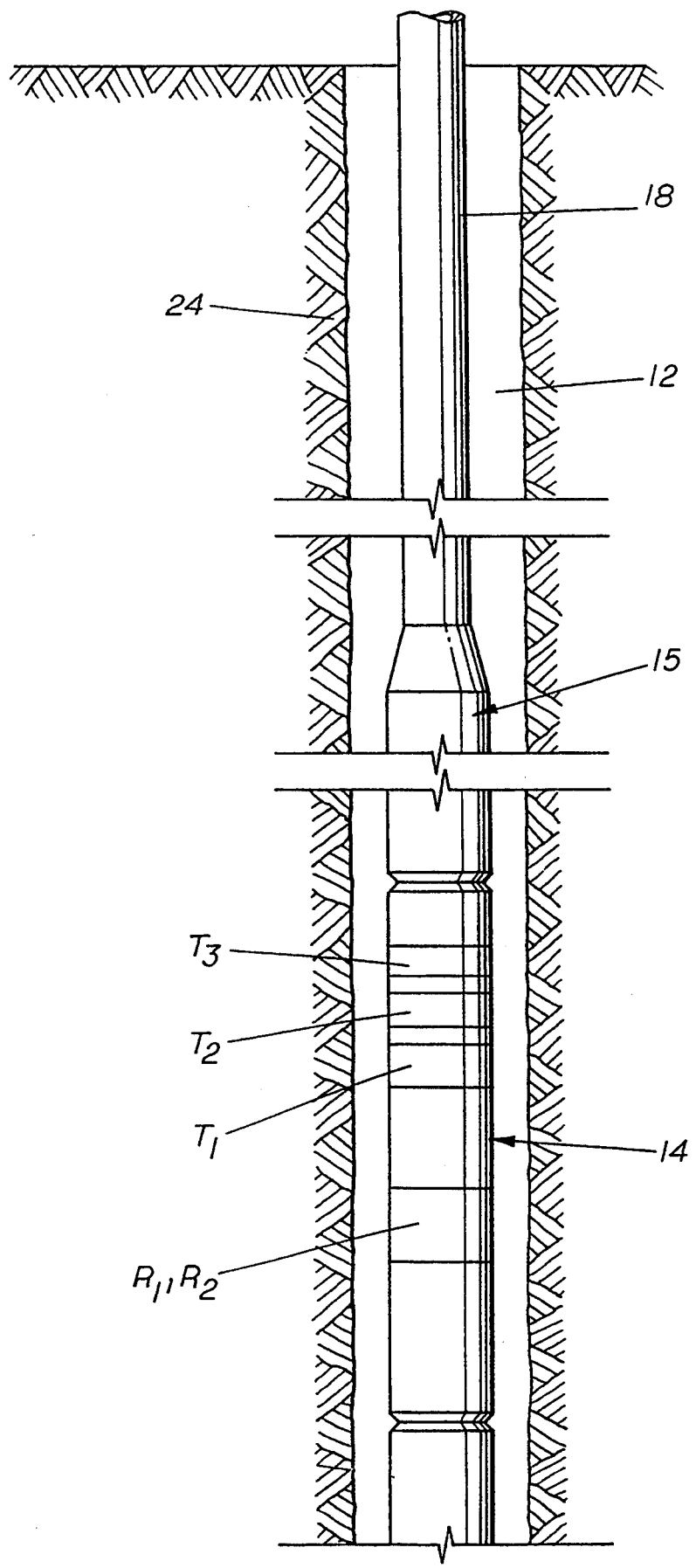
FIG. 2 is an elevated view of an MWD tool in accordance with the present invention which is suspended in an earth borehole as part of the drill string illustrated in FIG. 1.

Referring now to FIG. 2, them is illustrated in more detail the logging tool 14 in accordance with the present invention. The drill string includes one or more drill collars 15. A transmitter section comprised of transmitters $T_1$, $T_2$ and $T_3$ spaced along the length of the logging tool 14 is spaced from a receiver section that includes a pair of receivers, sometimes referred to herein as $R_1$ and $R_2$. When using transmitter frequencies which are different, for example, 2 MHz and 1 MHz, one can, if desired, use a pair of coils in each receiver, one tuned to 2 MHz and one tuned to 1 MHz. Each pair of such coils in a receiver can, if desired, be laid side by side around the periphery of the tool 14, or can be concentrically stacked. The transmitters $T_1$, $T_2$ and $T_3$, respectively, are covered over with a nonconductive material as is well known in the prior art. Likewise, the receiver section having receivers $R_1$ and $R_2$ is covered over with a non-conductive material. The transmitters and receivers can be fabricated in accordance with teachings of U.S. Pat. No. 4,940,943 assigned to the assignee of the present invention. It should be appreciated that the body of tool 14 is preferably made of steel in order to prevent the tool 14 from becoming a weak link in the drill string 18.

It should be appreciated that the logging tool 14 also has the requisite electronic circuitry (illustrated in FIG. 3) for processing the signals received by the receivers $R_1$ and $R_2$ in accordance with the present invention, thereby converting the received signals into a log or another indication of formation resistivity as a function of depth in the borehole. It should also be appreciated that the processed signals can be recorded within the electronics section of the tool 14 or may be fed by a conventional telemetry system (not illustrated) to the surface for concurrent processing and readout at the surface. Typical of such a well known telemetry system is one which generates mud pulses which can be detected at the earth's surface and which are indicative of the processed signals, which in turn are recorded as a function of depth in the borehole, all of which is conventional in the art.

Figure 3:
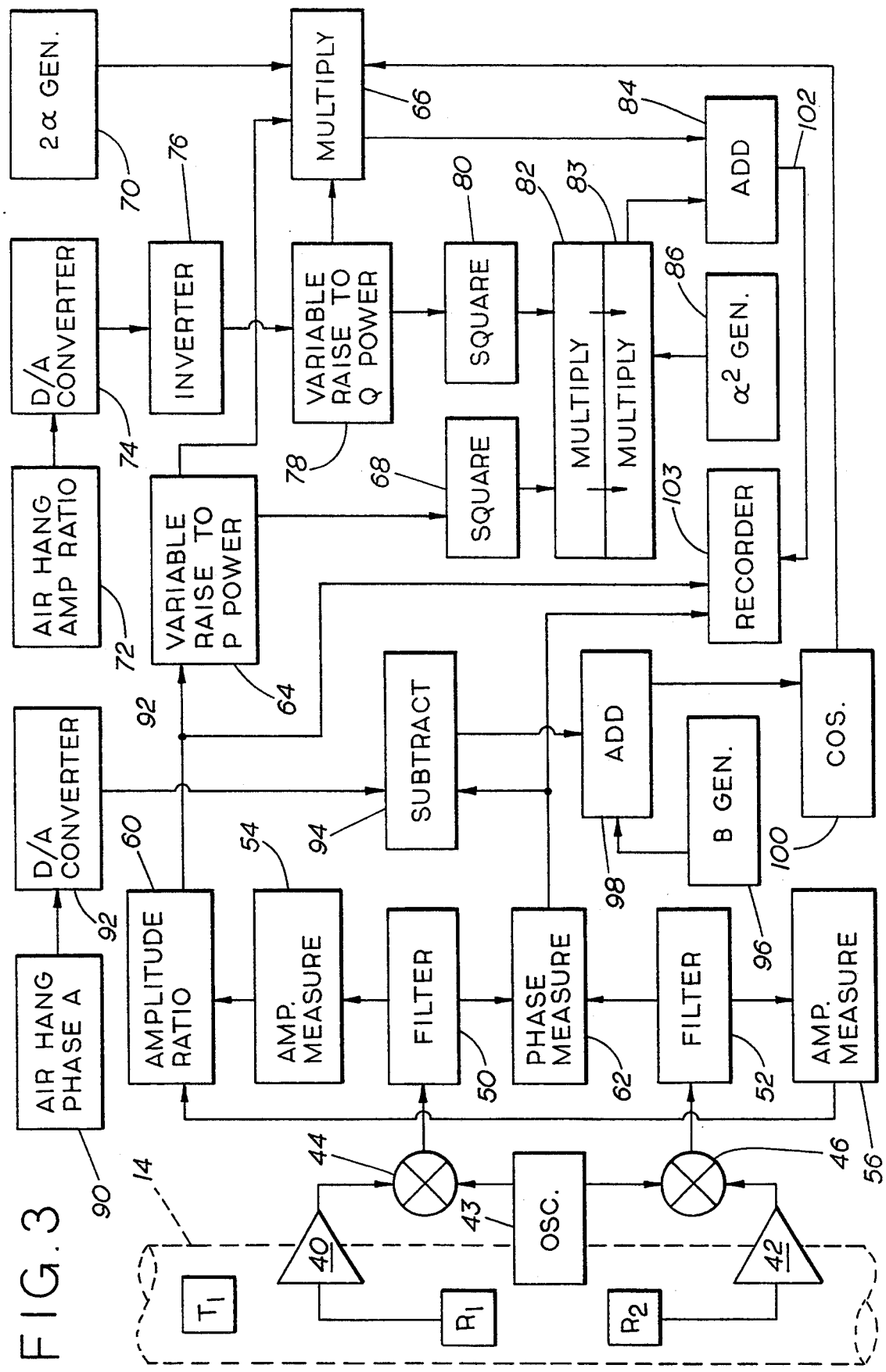
FIG. 3 is a block diagram of the circuitry used in processing the signals received at the single receiver pair in accord with the invention.

Referring now to FIG. 3, for purposes of more easily describing the invention, there is illustrated in block diagram a single transmitter $T_1$ having an output frequency of 2 MHz in use with a pair of receivers $R_1$ and $R_2$. The distance between the coils used for $R_1$ and $R_2$ is typically six inches along the longitudinal axis of the instrument 14. For purposes of illustration, the transmitter $T_1$ is spaced from receivers $R_1$ and $R_2$ distances along the longitudinal axis of 24" and 30", respectively.

The differential receiver pair $R_1$ and $R_2$ are respectively connected to amplifiers 40 and 42 which are connected, respectively, to mixer circuits 44 and 46. An oscillator 43 is connected to the respective additional inputs of mixer circuits 44 and 46.

The respective outputs of the mixer circuitry 44 and 46 drive Low Pass Filters 50 and 2 whose outputs drive, respectively, the Amplitude Measurement circuits 54, 56 whose outputs are connected, respectively, to the Amplitude Ratio circuit 60. The outputs of the Low Pass Filter circuits 50 and 52 are also connected to the inputs of the Relative Phase Measurement circuit 62. The output of the Relative Phase Measurement circuit 62 is coupled into one of the inputs of Subtract circuit 94 and also into one of the inputs of Recorder 103.

In the operation of the device and the circuitry illustrated in FIG. 3, it should be appreciated that it is desirable to process intermediate frequency signals rather than the nominal 2 MHz signals received by the receiver pair $R_1$ and $R_2$. Accordingly, the oscillator 43 is selected to be very near 2 MHz. For example, oscillator 43 can have a frequency of 1.998 MHz and thus provide an intermediate frequency coming out of the mixer circuit 44 or circuit 46 of 0.002 MHz (2 KHz). Thus, the only signals that pass to the low pass filters 50 and 52 will be the intermediate frequencies of 2 KHz. It should be appreciated that the amplitude measurement circuit 54 provides a measure of amplitude of the signal received by $R_1$, whereas circuit 56 measures the amplitude of the incoming signals received by the receiver $R_2$. Similarly, the relative phase measurement circuit 62 provides an indication of phase difference between the signals received at receiver $R_1$ and the signals received at receiver $R_2$. As is well known in the art, the amplitude ratio measurements and the relative phase measurements are individually indicative of formation resistivity.

The output of the Amplitude Ratio circuit 60 is connected to the input of a Variable Raise to P Power circuit 64 whose two outputs are connected, respectively, to one input of a Multiplication circuit 66 and to the input of a Squaring circuit 68. The output of Squaring circuit 68 drives one input of Multiplying circuit 82. A $2\alpha$ Generator circuit 70 drives a second input of the Multiplication circuit 66.

An Air Hang Amplitude Ratio circuit 72 has its output connected to a Digital-to-Analog circuit, whose output drives an Inverter circuit 76, whose output in turn drives a Variable Raise to Q Power circuit 78. The output of circuit 78 is squared by the squaring circuit 80, whose output is coupled into a second input of Multiplier circuit 82, whose output, in turn, drives one input of the Multiplier circuit 83. The output of Multiplier circuit 66 is coupled into an input of Add circuit 84. The output of $\alpha^2$ Generator 86 is coupled into an additional input of Multiplier circuit 83, whose output, in turn, is coupled into an input of Add circuit 84.

An Air Hang Phase Difference circuit 90 drives, a Digital-to-Analog converter circuit 92, whose output in turn is connected to a second input of Subtraction circuit 94. The output of Subtraction circuit 94 is connected to one input of Add circuit 98, the second input of Add circuit 98 being connected to the output of the $\beta$ Generator 96, the output of Add circuit 98 being converted to a cosine function by the COS circuit 100, the output of which supplies another input to the Multiplication circuit 66.

The output 102 of Add circuit 84 is a signal indicative of formation resistivity in accord with the present invention. The Multichannel recorder 103 can, if desired, be located in the well logging instrument 14, along with the remainder of the circuitry illustrated in FIG. 3. Alternatively, the outputs of Phase Measurement circuit 62 and of Amplitude Ratio circuit 60 can either be recorded downhole, or sent to the earth's surface using mud pulse telemetry, and the remainder of the processing circuitry be located at the earth's surface where it is much easier to adjust the variables such as $\alpha$, $\beta$, p and Q. In such latter event, a second Multichannel recorder (not illustrated) would be located at the earth's surface for recording the various signals, including amplitude attenuation, phase angle difference, and combinations of the amplitude attenuation and phase angle difference as contemplated by the present invention, all as a function of depth of the logging tool 14 in the borehole. Depth encoders for such purpose are conventional and require no additional explanation herein.

In the operation of the system in accord with the present invention, the Z-axis is defined as the axis of symmetry for an MWD logging instrument having current loop antennas lying in planes, respectively, perpendicular to the longitudinal axis of the instrument, since the antennas are sensitive, for the most part, only to the Z-component of the magnetic field. Since the antennas have a relatively small diameter, the field within the antennas is substantially directed along the Z-axis (the antennas only responding to field lines that they enclose).

To practice the invention, we begin by measuring the air-hang values. The air hang is not essential to our teaching, but, when properly included, increases the investigation depth. More importantly, it folds out instrumental errors. Dealing with the air hang, we use the following definitions:

$A_{zf}e^{i\theta_{af}}=$the field as it appears at the far antenna in air. $A_{zf}$ is the magnitude of the field and $\theta_{af}$ is the phase angle relative to an arbitrary but fixed reference.

$A_{zn}e^{i\theta_{an}}=$the field as it appears at the near antenna in air. $A_{zn}$ is the magnitude of the field and $\theta_{an}$ is the phase angle relative to the same fixed reference.

One can measure $A_{zf}$, $A_{zn}$ and $\theta_{af}-\theta_{an}$. Generally, $\theta_{af}-\theta_{an}$ (disregarding effects due to the instrumentation) is small enough to neglect. In practice, we do include $\theta_{af}-\theta_{an}$ in our calculation because it folds out the instrumental phase offset.

When the tool is in a medium M, we define the fields as follows:

$M_{zf}e^{i\theta_{mf}}=$the field as it appears at the far antenna in medium M. $M_{zf}$ is the magnitude of the field and $\theta_{mf}$ the phase angle of the field relative to the same fixed reference as with the measurements of air hang.

$M_{zn}e^{i\theta_{mn}}=$the field as it appears at the near antenna in medium M. $M_{zn}$ is the magnitude of the field and $\theta_{mn}$ is the phase angle of the field relative to the same fixed reference as with the measurements of air hang.

One can measure $M_{zf}$, $M_{zn}$, and $\theta_{mf}-\theta_{mn}$.

We have developed a representation of a combined field (CF) as follows:

$$CF = \alpha^2 \left(\frac{M_{zf}}{M_{zn}}\right)^{2p} \left(\frac{A_{zn}}{A_{zf}}\right)^{2Q} +$$

$$2\alpha \left(\frac{M_{zf}}{M_{zn}}\right)^p \left(\frac{A_{zn}}{A_{zf}}\right)^Q \cos[(\theta_{mf}-\theta_{mn}) - (\theta_{af}-\theta_{an}) + \beta)]$$

where P is a variable, positive or negative, but $P \neq 0$. In practicing the invention, we sometimes restrict P to $\geq -2$, but $\leq 2$. Q is another variable, and can be equal to zero. We frequently assign Q=P or Q=0. By assigning ranges to the values of P and Q, one can produce a continuum of values for CF. $\alpha$ is another variable, but not zero. In practice, we usually set $\alpha$ at $\leq -10$ but $\leq 10$, but $\alpha \neq 0$. $\beta$ is a specifiable parameter, dimensioned as an angle. In practice, we typically set $\beta=0$.

CF is a function of the conductivity $\sigma$ and of the dielectric constant. By fixing the dielectric constant to some value (based on experience, we often use a dielectric constant of 10 relative to air), CF is a single valued function of $\sigma$; we estimate a table of CF and $\sigma$ values in advance. After calculating CF, we interpolate into the table to find $\sigma$. The invention contemplates the variation of $\alpha$, P and Q (or at least one of these), depending on $\theta_{mf}-\theta_{mn}$, to thereby, provide a measurement of resistivity (conductivity) at as many depths of investigation as desired, even a continuum, without changing frequencies, spacings or the like.

Referring again to FIG. 3, especially with regard to the establishment of CF values, as the electromagnetic fields generated by $T_1$ are received from the formation surrounding the borehole at receivers $R_1$ and $R_2$, the respective amplitudes of the near and far receiver signals are measured within circuits 54 and 56 to produce $M_{zn}$ and $M_{zf}$, respectively, and which are combined in circuit 60 to produce $M_{zf}/M_{zn}$. $(\theta_{af}-\theta_{an})$, generated by circuits 90 and 92, is then subtracted from $(\theta_{mf}-\theta_{mn})$ produced by Phase Measurement circuit 62. The $\beta$ Generation 96 output is then added to $[(\theta_{mf}-\theta_{mn})-(\theta_{af}-\theta_{an})]$.

The circuits 72 and 74 produce $A_{zf}/A_{zn}$, which when inverted by circuit 76, generates $A_{zn}/A_{zf}$.

After passing through the remaining Raise to Power, Square, Multiplication and Add circuits, the output of the Add circuit 84 is CF.

In examining the establishment of various CF values for the same amplitude and phase data, at different depths of investigation, it is best to again review the preferred limitations we place upon the variables, viz., $\alpha$ is real and $\alpha \neq 0$ $\beta$ is real and except in certain cases has little importance. When $\beta = \pi$, the sign of $\alpha$ is effectively reversed.

p is real and $p \neq 0$

Q is real. In all applications to date, we have chosen either Q=p or Q=0. To date, the following cases have been examined:

$p=Q=-1, \alpha>0$

Figure 4:
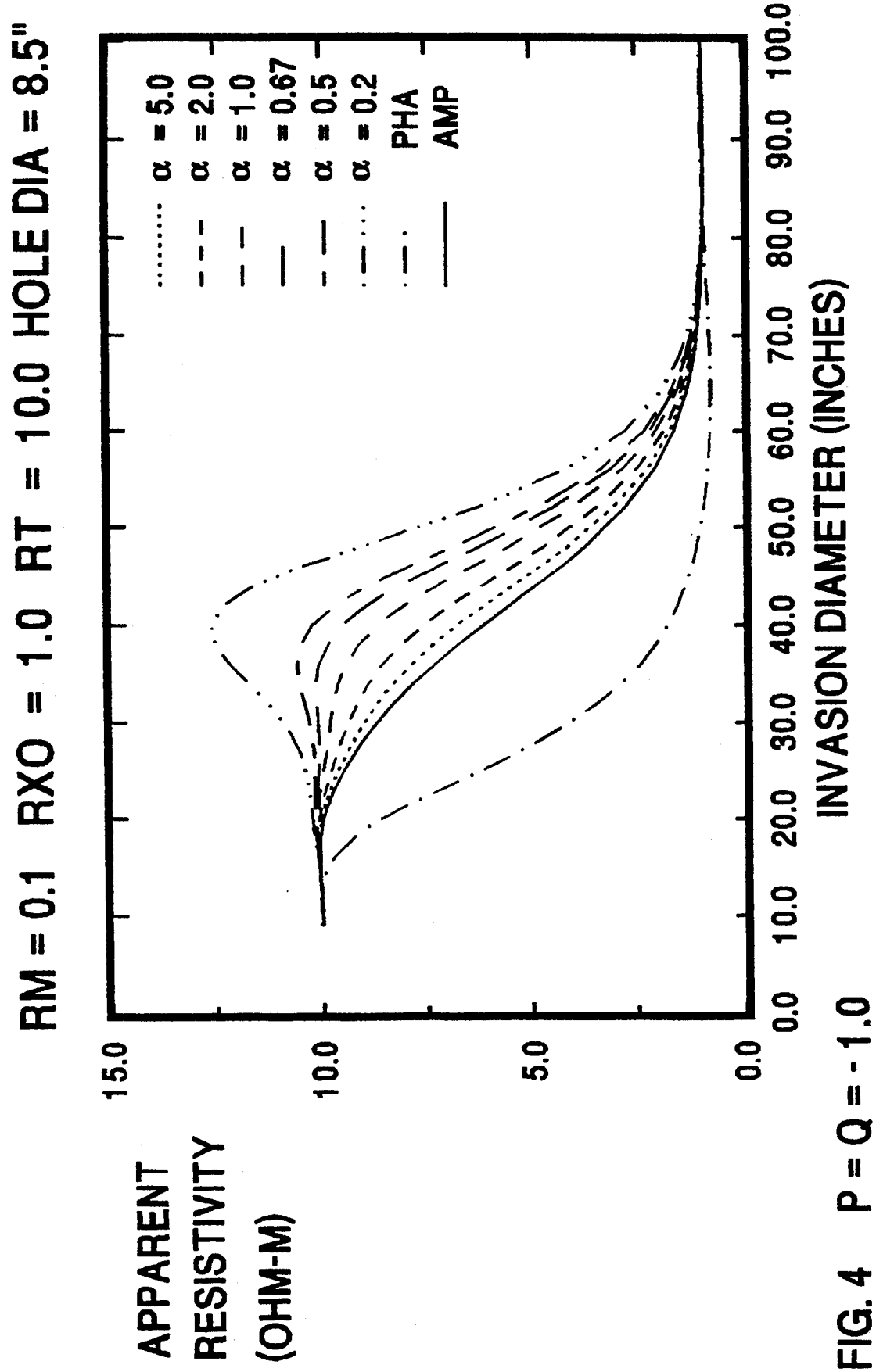

For very large $\alpha$, the CF value approaches the amplitude ratio value, as illustrated in FIG. 4. As $\alpha$ decreases, the CF value progressively reads deeper than the amplitude ratio value. However, if a is decreased too far, this can result in unphysical solutions; i.e., we cannot interpret the results on a homogeneous response model.

$p=Q=-1, \alpha<0$

Figure 5:
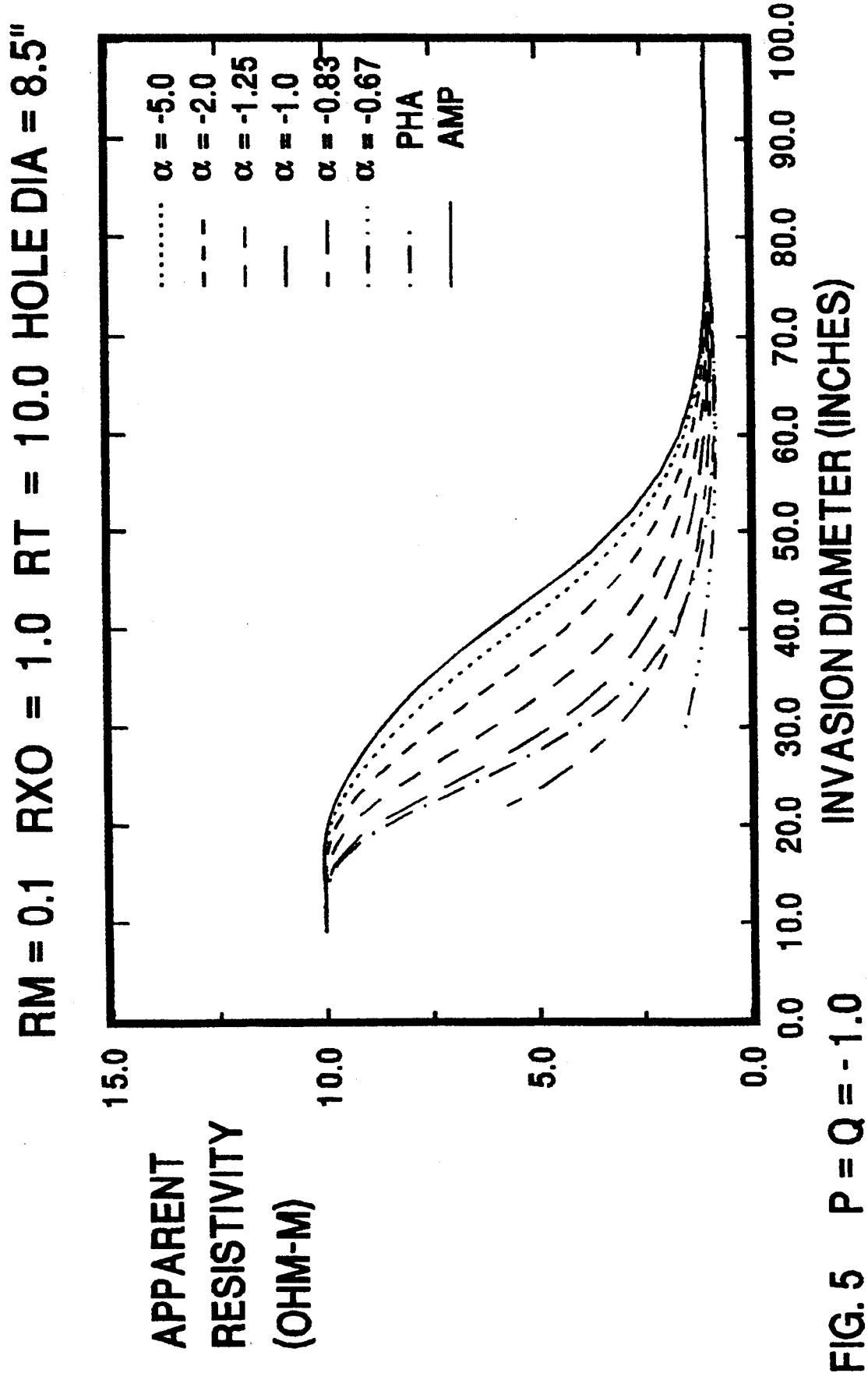

As the magnitude of $\alpha$ increases, this curve (illustrated in FIG. 5) moves from one that generally reads shallower than the phase-based (only) curve up to the amplitude-based (only) curve. Below a value of $\alpha=-1/1.5$, no solution was possible. General comment about the above two cases, $p=Q=-1$:

If we replace the parameter $\alpha$ by $\gamma=1/\alpha$, then the curves move in a continuum. As $\gamma$ is increased from its smallest allowable value, the curve reads progressively deeper. In the limiting case of $\gamma=0$ (but only in a strict limiting sense), the curve overlays the amplitude-ratio-based curve. Once $\gamma$ is positive, the CF reading is deeper than the amplitude-ratio-based reading.

$p=Q=1, \alpha>0$

Figure 6:
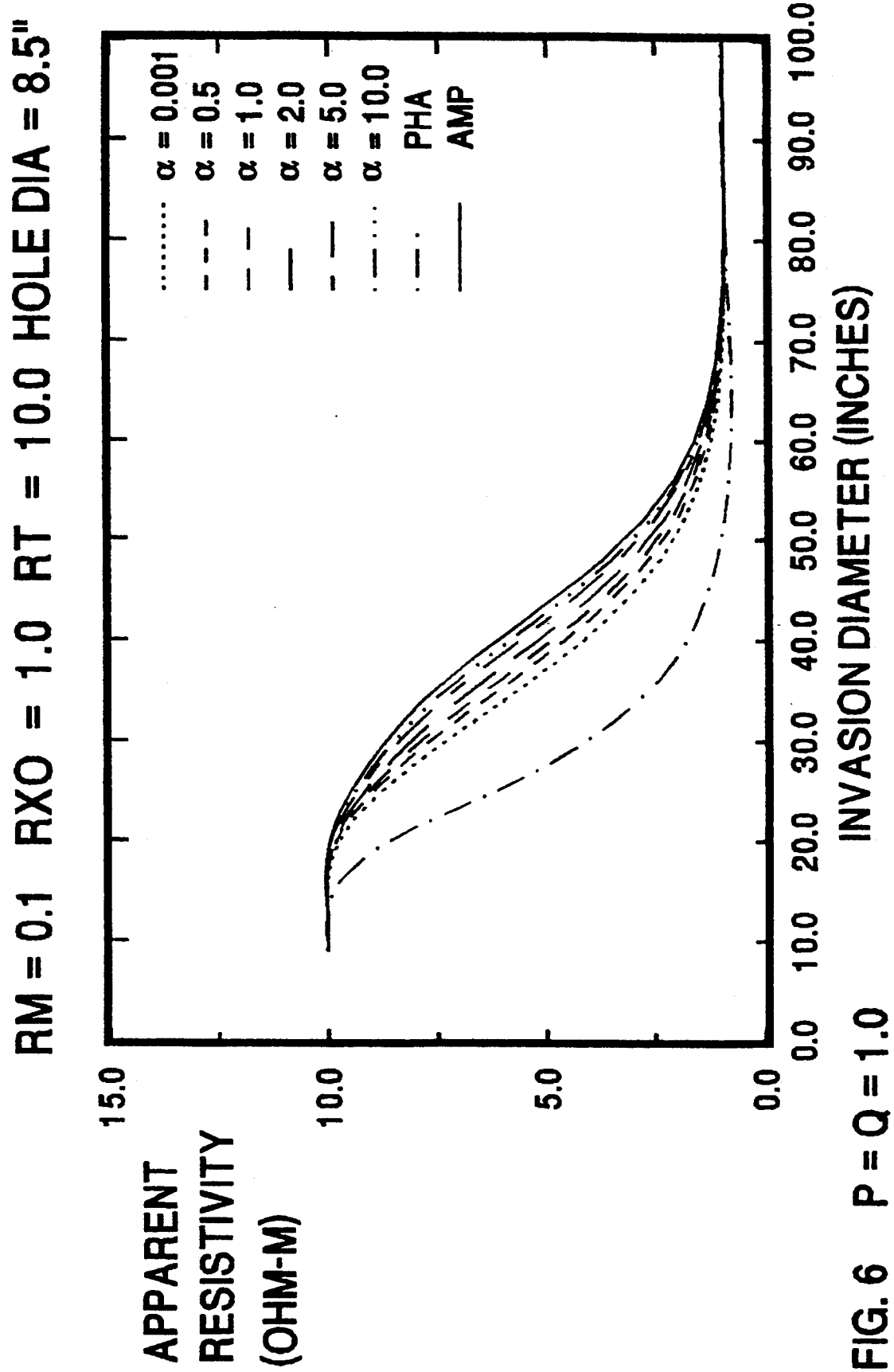

For large $\alpha$, the curve is close to, but beneath the amplitude ratio (only) curve, as illustrated in FIG. 6. As $\alpha$ decreases, the curve reads progressively shallower. However, the curve is always between the amplitude-ratio- and phase-difference-based curves and appears to limit (for large $\alpha$) to a curve that is about halfway between the phase difference and amplitude-ratio-based curves.

$p=Q=1, \alpha<0$

Figure 7:
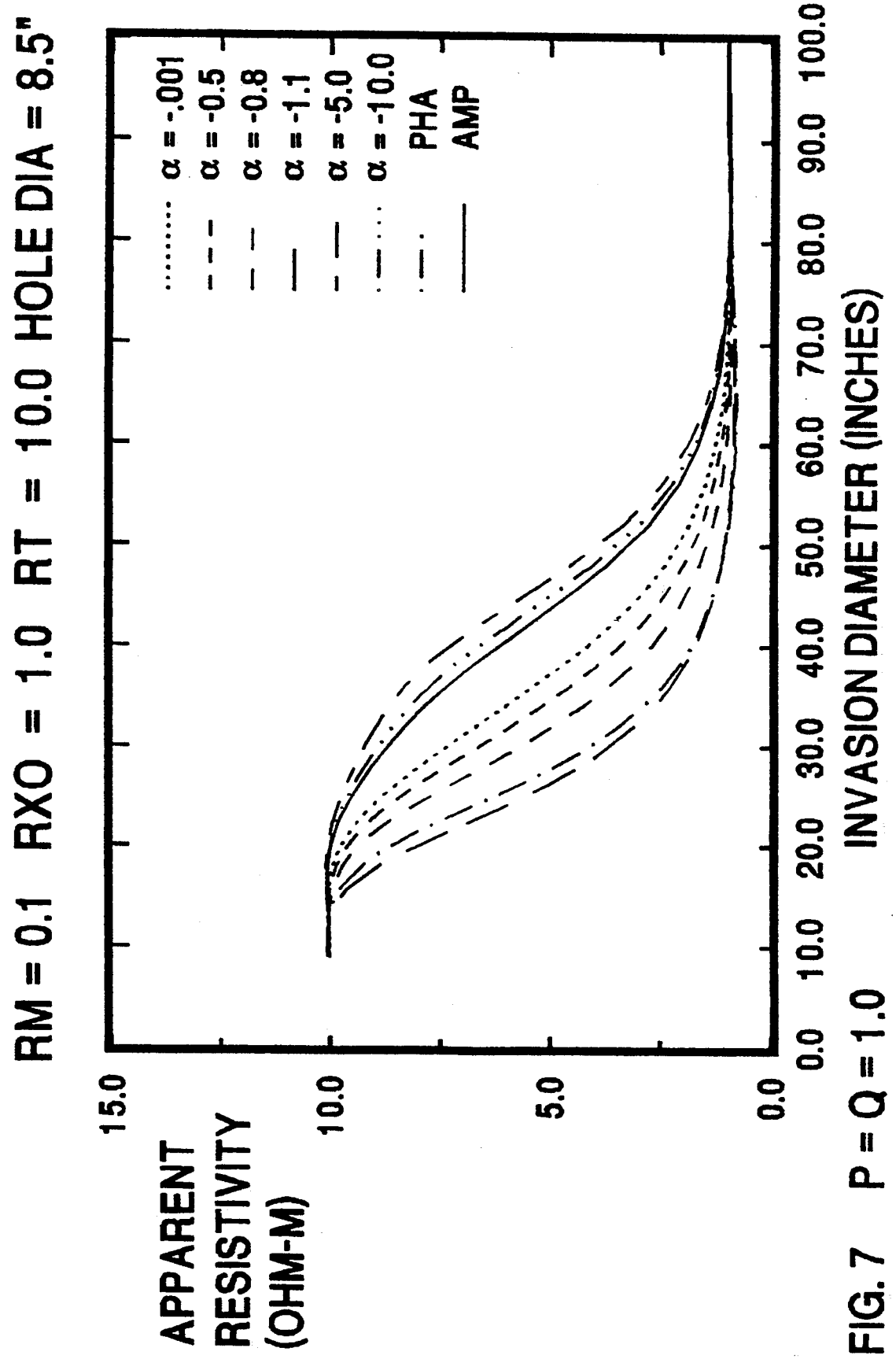

As the magnitude of $\alpha$ decreases, the curve illustrated in FIG. 7 reads deeper and as with the case when $\alpha>0$, limits to a curve about halfway between the phase difference and amplitude-ratio- based curves as the magnitude of $\alpha$ approaches zero. As the magnitude of $\alpha$ increases, the curve reads progressively shallower until it finally reads shallower than the phase-difference- based resistivity. However, for the example of $R_m=0.1$ $\Omega$m, $R_{xo}=1.0$ $\Omega$m, $R_t=10.0$ $\Omega$m in an 8.5" diameter borehole, a limit is reached at $\alpha - -1.2$ below which solutions for $R_a$ (relative to a homogeneous response) do not exist. Curiously, as $\alpha$ is further decreased, beneath $\alpha=-5$, the response can again be calculated and is now deeper than the amplitude-ratio-based resistivity. As the magnitude of $\alpha$ is further increased, the combined-field-based curve limits to the amplitude-ratio-based resistivity; this is to be expected from theory.

$\alpha=-1, p=Q, p<0, \beta=0$

In this case the exponents appear to have little effect on the response, as illustrated in FIG. 8.

$\alpha=1$, p=Q, p<0, $\beta=0$

Of the four cases to be considered, this is the most interesting. FIG. 9 shows a plot of the combined-field-based resistivity for $-2 \leq p \leq -0.5$. It is seen that as p→0, the response approaches the amplitude-ratio-based response. As p becomes more negative, the depth of investigation increases, but, as with certain values of $\alpha$, the response curve develops an undesirable peak.

$\alpha=-1$, p=Q, p>0, $\beta=0$

As with the previous case with $\alpha=-1$, them is little variation in the response over a wide range of values of p. This is shown in FIG. 10.

$\alpha=1$, p=Q, p>0, $\beta=0$

In this case, the depth of investigation decreases as p increases, as is illustrated in FIG. 11.

Means for Obtaining a Common Depth of Investigation

Pick a value, $G_d$, of the pseudogeometric factor that will be used to define depth of investigation.

Pick a diameter of investigation, D, that is within the range of the sensor's response, and pick an allowable error in D, $\delta D$. The depth of investigation determined by the combined field method will be between $D-\delta D$ and $D+\delta D$.

The concept can be illustrated in many ways, but is easily illustrated by considering the combined field method where $p=Q=-1$. In this case, the depth of investigation is a continuous and monotonic function of the parameter $1/\alpha$. For simplicity, let $$\gamma = 1/\alpha$$

Pick two extreme values for $\gamma$: $\gamma_{min}$ and $\gamma_{max}$. The actual value of $\gamma$ that will give a depth of investigation D will be determined by iteration between $\gamma_{min}$ and $\gamma_{max}$. For the particular choice $p=Q=-1$, it is convenient to choose $$\gamma_{min} = -1.5$$

and $$\gamma_{max} = 2.0.$$

With the particular case under consideration, a simple binomial search (or bisection) technique can be used to find a value of $\gamma$ that sets the response at the desired diameter of investigation.

We begin with an approximation: Choose $R_{xo}=R_{Pha}$, where $R_{xo}$ is the invaded zone resistivity (estimated) and $R_{Pha}$ is the apparent resistivity as inferred from the phase difference alone. If there is a good contrast between $R_{xo}$ and $R_t$ (the true formation resistivity), and $R_{Pha}$ has been strongly affected by invasion, this will be a good approximation. In cases of poor contrast, the method may fail, in which case a simplified version of the same method to be described later can be used. If the method does fail due to poor contrast conditions, an indication is provided of these conditions. It should be commented that other means can be used to estimate $R_{xo}$. For example, if a plurality of sensors is available, the shallowest reading sensor can be used to provide an estimate of $R_{xo}$. Likewise, if a knowledge of the porosity and of the mud filtrate resistivity is available from other sensors, $R_{xo}$ can be estimated using Archie's equation. If wireline logs are available with a microresistivity measurement either from the well under consideration or from offset wells, these measurements can be used to infer $R_{xo}$. As an alternative, an estimate can be made of $R_{xo}$ using a very shallow combined field calculation (it has been our experience that with the parameters p, Q, $\alpha$ and $\beta$ fixed, the general features of a combined field calculation remain the same; i.e., if the combined field measurement provided a reading shallower than phase with these parameters and with a particular $R_{xo}$ and $R_t$, it will with other values of $R_{xo}$ and $R_t$.)

The following steps are carried out iteratively:

(1) set $\gamma_{mid}=(\gamma_{min}+\gamma_{max})/2$ if $\gamma_{mid}=0$, terminate execution and write error message.

(2) Calculate CF from the formula $$CF = \alpha^2 \left(\frac{M_{zf}}{M_{zn}}\right)^{2p} \left(\frac{A_{zn}}{A_{zf}}\right)^{2Q} +$$

$$2\alpha \left(\frac{M_{zf}}{M_{zn}}\right)^{p} \left(\frac{A_{zn}}{A_{zf}}\right)^{Q} \cos[(\theta_{mf} - \theta_{mn}) - (\theta_{af} - \theta_{an}) + \beta)]$$

(3) Calculate $R_a$, an apparent resistivity using CF. It is preferable to do this by interpolating into a table of CF values that has been calculated for $\gamma=\gamma_{mid}$ using theoretical values of the phase and amplitude ratio over a range of resistivities in an infinite homogeneous medium. In a preferred embodiment, such tables would be calculated in advance. As a practical matter, since only a finite number of tables can be stored in a computer, the table for a specific $\gamma_{mid}$ would be determined by well-known interpolation techniques.

(4) Calculate an estimated value of $R_t$ from $R_a$, $R_{xo}$ and $G_d$ using the relation $$R_t = \frac{1-G}{\frac{1}{R_a} - \frac{G}{R_{xo}}}$$

(5) For the values of $\gamma_{mid}$, $R_t$ and $R_{xo}$ estimate the diameter of investigation, $D_c$. This will be the invasion diameter at which the pseudogeometric factor equals $G_d$.

From a practical standpoint, this would again be accomplished by interpolating between previously calculated tables.

(6) Determine if the iteration is complete: If $D-\delta \leq D_c \leq D+\delta$, go to step 9; otherwise, go to step 7.

(7) Determine the contrast between $R_t$ and $R_{xo}$

If $C_{lower} \leq R_t/R_{xo} \leq C_{upper}$, terminate the iteration and use the alternative method of calculation.

In the above expression, $C_{lower}$ and $C_{upper}$ are predetermined cutoffs on the contrast between $R_t$ and $R_{xo}$. Typical values for $C_{lower}$ and $C_{upper}$ would be $$C_{lower} = 1.30$$

and $$C_{upper} = 0.77$$

The cutoffs, $C_{lower}$ and $C_{upper}$, are determined mostly from the user's needs and from experience with the process. For example, the user may not be interested in cases within certain contrast bounds, or, based on experience with the process, it may be determined that it converges too slowly for practical calculations within certain contrast ranges. In this case, lookup tables could again be used to determine when the calculation will not converge.

(8) Provide new estimates of $\gamma_{min}$, $\gamma_{mid}$ and $\gamma_{max}$

If $D_c<D-\delta$, then $\gamma_{min}$, $\gamma_{mid}$ is too small. Modify them as follows:

Set $\gamma_{max}=\gamma_{mid}$

Go to step 1 (which will re-calculate $\gamma_{mid}$)

Otherwise, it must be the case that $D_c>D+\delta$; in this case, $\gamma_{mid}$ and $\gamma_{max}$ are too large Set $\gamma_{max}=\gamma_{mid}$ Go to step 1 (which will re-calculate $\gamma_{mid}$).

(9) Report the last value of $R_a$ and, if desired, the values of $\gamma_{mid}$ and $R_1$; note that in this case, $R_t$ is only an estimate of the true formation resistivity.

Alternative Method

This method is a minor variant to the previous method and is to be used when there is a low contrast between $R_{xo}$ and $R_t$. In this case, the investigation depth is essentially a function only of $R_t$, $\alpha$ (or alternatively $\gamma=1/\alpha$ in the previous illustration of the method), p, Q and $\beta$. Essentially, the technique is the same as outlined above, but in the calculation of the lookup tables, or alternatively in the analytical calculations, no value is used for $R_{xo}$. Instead, the tables are calculated by choosing an artificial value of $R_{xo}$ that is very close (typically within 1%) of $R_1$. Because of their independence from $R_{xo}$, these tables are less exhaustive than the tables normally used. In all other respects, one follows the procedure outlined above.

Those skilled in the art will recognize that other methods and apparatus may be used to control or establish a common depth of investigation. For example, by using well-known feedback loop circuitry, the values for one or more of the p, Q, $\alpha$ and B parameters can be varied to continuously control the depth of investigation as the logging instrument traverses the length of the borehole.

What is claimed:

1. Apparatus for determining the resistivity of earth formations surrounding a borehole comprising:
   means for generating electromagnetic wave energy at a first location in the borehole;
   means for receiving electromagnetic wave energy at second and third locations in the borehole, said second and third locations being successively spaced longitudinally in the borehole from said first location;
   means for detecting the phase shift between electromagnetic energy received at said second and third locations in the borehole;
   means for generating a first signal functionally related to said phase shift;
   means for detecting the attenuation between electromagnetic energy received at said second and third locations in the borehole;
   means for generating a second signal functionally related to said attenuation;
   variable means for combining said first and second signals to generate a third signal functionally related to the resistivity of the formation at a first depth of investigation and for combining said first and second signals to generate a fourth signal functionally related to the resistivity of the formation at a second depth of investigation different from said first depth of investigation.

2. The apparatus according to claim 1, including in addition thereto, means for recording said third and fourth signals as a function of the depth of the apparatus in the borehole.

3. The apparatus according to claim 2, including in addition thereto, means for recording said first signal as a function of the depth of the apparatus in the borehole.

4. The apparatus according to claim 2, including in addition thereto, means for recording said second signal as a function of the depth of the apparatus in the borehole.

5. The apparatus, according to claim 2, including in addition thereto, means for recording said first and second signals as a function of the depth of the apparatus in the borehole.

6. Apparatus for determining the resistivity of earth formations surrounding a borehole, comprising:
   means for generating electromagnetic wave energy at a first location in the borehole;
   means for receiving electromagnetic wave energy at second and third locations in the borehole, said second and third locations being successively spaced longitudinally in the borehole from said first location;
   means for detecting the phase shift between electromagnetic energy received at said second and third locations in the borehole;
   means for generating a first signal functionally related to said phase shift;
   means for detecting the attenuation between electromagnetic energy received at said second and third locations in the borehole;
   means for generating a second signal functionally related to said attenuation;
   variable means for combining said first and second signals to generate a plurality of additional signals functionally related, respectively, to the resistivity of the formation at a plurality of depths of investigation, respectively.

7. The apparatus according to claim 6, including in addition thereto, means for recording at least one of said plurality of additional signals as a function of depth of the apparatus in the borehole.

8. The apparatus according to claim 7, including in addition thereto, means for recording said first signal as a function of the depth of the apparatus in the borehole.

9. The apparatus according to claim 7, including in addition thereto, means for recording said second signal as a function of the depth of the apparatus in the borehole.

10. The apparatus, according to claim 7, including in addition thereto, means for recording said first and second signals as a function of the depth of the apparatus in the borehole.

11. A method for determining the resistivity of earth formations surrounding a borehole, comprising the steps of:
    generating electromagnetic wave energy at a first location in the borehole;
    receiving electromagnetic wave energy at second and third locations in the borehole, said second and third locations being successively spaced longitudinally in the borehole from said first location;
    detecting the phase shift between electromagnetic energy received at said second and third locations in the borehole and generating a first signal functionally related to said detected phase shift;

detecting the attenuation between electromagnetic energy received at said second and third locations in the borehole and generating a second signal functionally related to said detected attenuation; and variably combining said first and second signals to generate third and fourth signals functionally related to the resistivity of the formation at first and second different depths of investigation.

12. A method for determining the resistivity of earth formations surrounding a borehole, comprising the steps of:

generating electromagnetic wave energy at a first location in the borehole;

receiving electromagnetic wave energy at second and third locations in the borehole, said second and third locations being successively spaced longitudinally in the borehole from said first location;

detecting the phase shift between electromagnetic energy received at said second and third locations in the borehole and generating a first signal functionally related to said detected phase shift;

detecting the attenuation between electromagnetic energy received at said second and third locations in the borehole and generating a second signal functionally related to said detected attenuation; and variably combining said first and second signals to generate third and fourth signals functionally related to the resistivity of the formation at a plurality of depths of investigation, respectively.

13. A method for determining the resistivity of earth formations surrounding a borehole, comprising the steps of:

generating electromagnetic wave energy at a first location in the borehole;

receiving electromagnetic wave energy at second and third locations in the borehole, said second and third locations being successively spaced longitudinally in the borehole from said first location;

detecting the phase shift between electromagnetic energy received at said second and third locations in the borehole and generating a first signal functionally related to said detected phase shift;

detecting the attenuation between electromagnetic energy received at said second and third locations in the borehole and generating a second signal functionally related to said detected attenuation; and variably combining said first and second signals to produce an indication of formation resistivity at a common depth of investigation as said first location of generating energy moves along the length of the borehole, independent of variations in the detected phase shift and the detected attenuation.

14. A method for determining the resistivity of earth formation surrounding a borehole, comprising the steps of:

generating electromagnetic wave energy at a first location in the borehole;

receiving electromagnetic wave energy at second and third locations in the borehole, said second and third locations being successively spaced longitudinally in the borehole from said first location;

detecting the phase shift between electromagnetic energy received at said second and third locations in the borehole and generating a first signal functionally related to said detected phase shift;

detecting the attenuation between electromagnetic energy received at said second and third locations in the borehole and generating a second signal functionally related to said detected attenuation; and variably combining said first and second signals to produce an indication of the resistivity of the formation at a controlled depth of investigation independent of variations in the detected phase shift and the detected attenuation.

15. Apparatus for determining the resistivity of earth formations surrounding a borehole comprising:

means for generating electromagnetic wave energy at a first location in the borehole;

means for receiving electromagnetic wave energy at second and third locations in the borehole, said second and third locations being successively spaced longitudinally in the borehole from said first location;

means for detecting the phase shift between electromagnetic energy received at said second and third locations in the borehole;

means for generating a first signal functionally related to said phase shift;

means for detecting the attenuation between electromagnetic energy received at said second and third locations in the borehole;

means for generating a second signal functionally related to said attenuation;

variable means for combining said first and second signals to generate a third signal functionally related to the resistivity of the formation at a controllable depth of investigation as said means for generating electromagnetic wave energy at a first location moves along the length of the borehole, independent of variations in the detected phase shift and the detected attenuation.

16. The apparatus according to claim 15, including in addition thereto, means for recording said third signal as a function of the depth of the apparatus in the borehole.

17. The apparatus according to claim 16, including in addition thereto, means for recording said first signal as a function of the depth of the apparatus in the borehole.

18. The apparatus according to claim 16, including in addition thereto, means for recording said second signal as a function of the depth of the apparatus in the borehole.

19. The apparatus, according to claim 16, including in addition thereto, means for recording said first and second signals as a function of the depth of the apparatus in the borehole.

20. Apparatus for determining the resistivity of earth formations surrounding a borehole comprising:

means for generating electromagnetic wave energy at a first location in the borehole;

means for receiving electromagnetic wave energy at second and third locations in the borehole, said second and third locations being successively spaced longitudinally in the borehole from said first location;

means for detecting the phase shift between electromagnetic energy received at said second and third locations in the borehole;

means for generating a first signal functionally related to said phase shift;

means for detecting the attenuation between electromagnetic energy received at said second and third locations in the borehole;

means for generating a second signal functionally related to said attenuation;

variable means for combining said first and second signals to generate a third signal functionally related to the resistivity of the formation at a first depth of investigation and to generate a fourth signal, functionally related to the resistivity of the formation at a second depth of investigation different from said first depth of investigation.

* * * * *